United States Patent [19]
Vidovic

[11] 3,852,617
[45] Dec. 3, 1974

[54] APPARATUS FOR LEVEL SHIFTING INDEPENDENT OF SIGNAL AMPLITUDE HAVING A PASSIVE PEAK DETECTOR

[75] Inventor: Nikola Vidovic, Sunnyvale, Calif.
[73] Assignee: International Video Corporation, Sunnyvale, Calif.
[22] Filed: Jan. 2, 1973
[21] Appl. No.: 320,092

[52] U.S. Cl................ 307/235, 307/293, 307/246, 328/150
[51] Int. Cl........................................... H03k 17/00
[58] Field of Search ...... 307/235 A, 246, 293, 228; 324/103 P; 328/150; 329/192

[56] References Cited
UNITED STATES PATENTS

| | | | |
|---|---|---|---|
| 2,941,070 | 6/1960 | Barry | 329/192 |
| 3,013,164 | 12/1961 | Greenberg | 307/228 |
| 3,048,717 | 8/1962 | Jenkins | 307/235 A |
| 3,178,583 | 4/1965 | Koch | 328/150 |
| 3,188,496 | 6/1965 | Ballard | 307/202 |
| 3,237,023 | 2/1966 | Wilhelm | 307/235 A |
| 3,770,984 | 10/1973 | Connor et al. | 307/235 |

Primary Examiner—Rudolph V. Rolinec
Assistant Examiner—B. P. Davis
Attorney, Agent, or Firm—Limbach, Limbach & Sutton

[57] ABSTRACT

A level shifting circuit employing a passive peak detector including a transistor receiving the input signal at its emitter and having the charging capacitor between its collector and ground so that the voltage drop is only the small saturation voltage of the transistor, which varies only slightly with temperature. A discharging resistor in the base lead biases the transistor off when the input voltage drops below the peak. A signal to be level shifted is applied to the passive peak detector and a portion of the peak signal is subtracted from the signal in order to shift its level.

4 Claims, 7 Drawing Figures

3,852,617

APPARATUS FOR LEVEL SHIFTING INDEPENDENT OF SIGNAL AMPLITUDE HAVING A PASSIVE PEAK DETECTOR

BACKGROUND OF THE INVENTION

The present invention relates generally to pulse processing and more particularly to and a level shifter having a passive peak detector for use in a phase locked loop.

Prior art peak detectors, particularly for frequencies over several magahertz, usually consist of a diode, capacitor and discharging resistor. The use of a diode, silicon or germanium, results in inaccurate peak readings because of the relatively high voltage drop across the diode and because of the temperature dependence of the voltage drop.

In phase locked loops using the ramp sampling technique it is critical to generate a linear ramp symmetrically disposed above and below zero volts so that sampling the ramp midway results in a zero volt sample. Failure to symmetrically locate the ramp around zero volts results in a static error when the ramp is sampled thus upsetting the loop operation.

SUMMARY OF THE INVENTION

In accordance with the teachings of the present invention a level shifter is provided having a passive transistor peak detector comprising a PNP transistor (for positive peak detection) or an NPN transistor (for negative peak detection) arranged in a circuit with a peak charging capacitor in its collector to ground path and a discharging resistor in its base to ground path. The voltage drop is only the saturation voltage of the transistor, typically 100–200 mV, on the order of five times less than the prior art diode. Further, the temperature coefficient of the transistor saturation voltage is less than 0.2mV/°C., on the order of 10 times less than the same coefficient of the prior art diode. Thus, the peak voltage at the collector capacitor is substantially more accurate than in the prior art diode arrangement. The capacitor discharges through the collector base diode of the transistor, providing positive voltage on the base which turns the transistor off as soon as the input voltage drops below its detected peak value.

The level shifter is advantageously used in a ramp sampling type phase locked loop. The ramp to be sampled is first passed through the level shifter which locates the ramp symmetrically with respect to a reference voltage. The level shifter includes the passive transistor peak detector circuit described above. The ramp to be shifted is applied to the peak detector and the peak voltage is halved in a voltage divider. The halved peak voltage is subtracted from the ramp to automatically provide a level shifted ramp disposed around a zero volt reference level. Because of the substantially greater accuracy of the passive transistor peak detector the shifted ramp is more accurately located with respect to zero than as if a prior art peak detector were used.

These and other advantages will be better understood as the following description of the preferred embodiments is read and understood.

DESCRIPTION OF THE PREFERRED EMBODIMENTS

Figure 1:
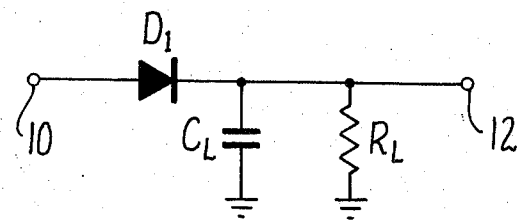
FIG. 1 is a schematic circuit diagram of a prior art peak detector.

A typical prior art positive peak detector especially for signals over several MHz is shown in FIG. 1. A positive signal applied at input terminal 10 charges capacitor $C_L$ through the diode D1 to a value intended to represent the maximum positive input signal voltage. Resistor $R_L$ discharges the capacitor in accordance with the time constant of $C_L$ and $R_L$. The "peak" voltage is available at output terminal 12. If a negative peak is to be detected, the diode is reversed, of course.

The conventional prior art peak detector such as in FIG. 1, suffers from several shortcomings. First, the voltage drop across diode D1 is in the order of 0.6 volts for silicon diodes and 0.3 volts for germanium diodes. Second, this voltage drop is temperature dependent and changes at the rate of approximately −2mV/°C. Thus, this diode-capacitor type peak detector is subject to inaccuracies.

Figure 2:
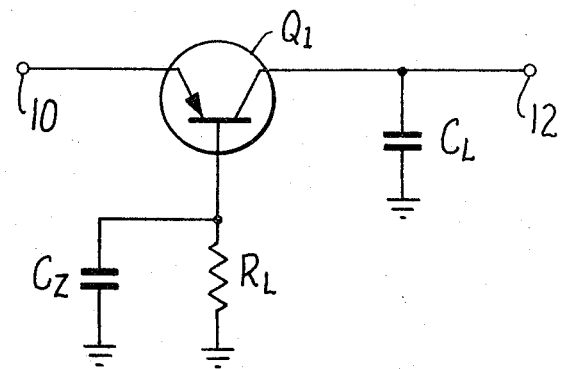
FIG. 2 is a schematic circuit diagram of a peak detector employed in one embodiment of the level shifter of the present invention.

In one embodiment of the peak detector according to the present invention as shown in FIG. 2 a positive voltage at input terminal 10 is applied to the emitter of Q1 and causes transistor Q1 to saturate. The emitter-collector voltage drop is very low, on the order of five times lower than that of a silicon or germanium diode, hence capacitor $C_L$ charges to a value much closer to the true peak voltage. When the input voltage drops below maximum, Q1 turns off and $C_L$ discharges through $R_L$ due to the collector-base diode action. The values of $R_L$ and $C_L$ determine the discharge time. Capacitor $C_Z$ between the base of Q1 and ground is for greater speed; it keeps the base impedance low and permits Q1 to saturate more rapidly.

It should be noted that the circuit of FIG. 2 detects peaks only down to the base-emitter voltage drop, $V_{be}$. If detection down to zero volts is desired bias must be applied in a manner well known to those of ordinary skill in the art.

Figure 3:
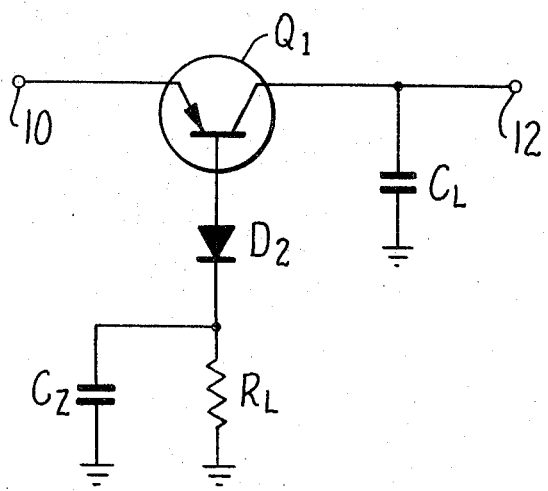
FIG. 3 is a schematic circuit diagram of a peak detector employed in a further embodiment of the level shifter of the present invention.

If a higher voltage breakdown is desired than obtainable across the base-emitter junction of Q1, a diode D2 may be placed in series with the base of Q1 as shown in FIG. 3.

Figure 4:
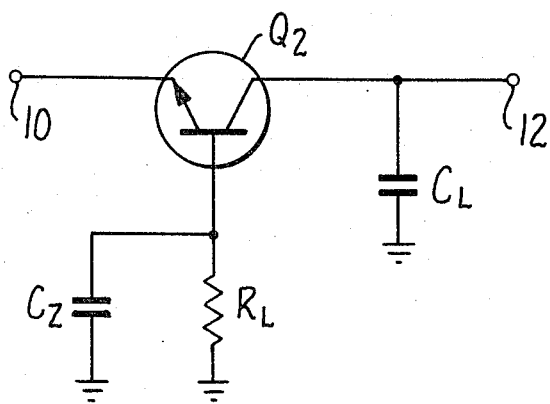
FIG. 4 is a schematic circuit diagram of a peak detector employed in yet a further embodiment of the level shifter of the present invention.

In order to sample the peaks of negative going waveforms, an NPN transistor Q2 is used as shown in FIG. 4 instead of a PNP transistor as in FIGS. 2 and 3.

Figure 5:
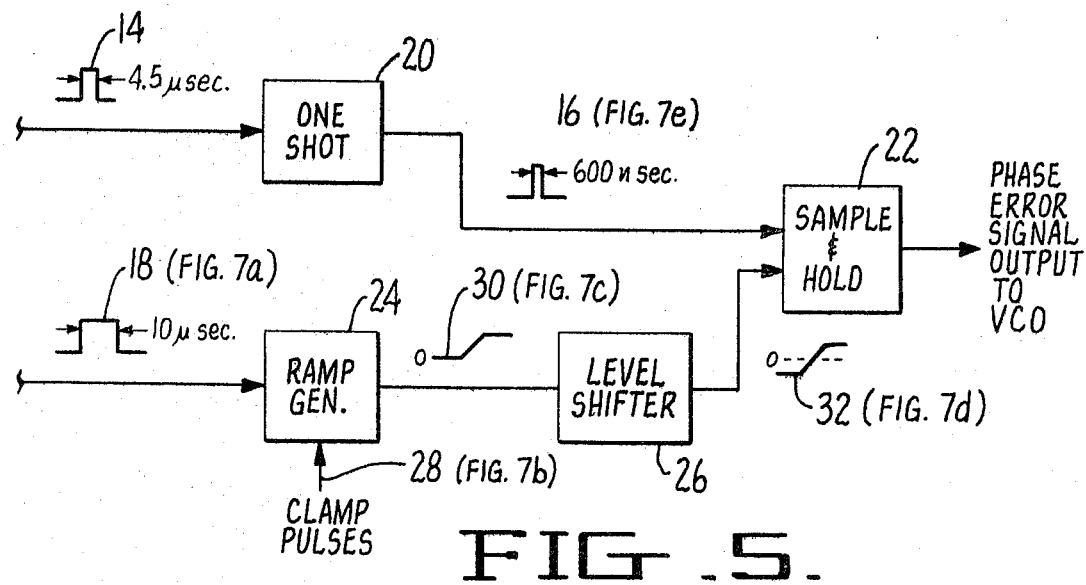
FIG. 5 is a block diagram of a portion of a phase locked loop showing the environment for a level shifter according to an embodiment of the present invention.
Figure 6:
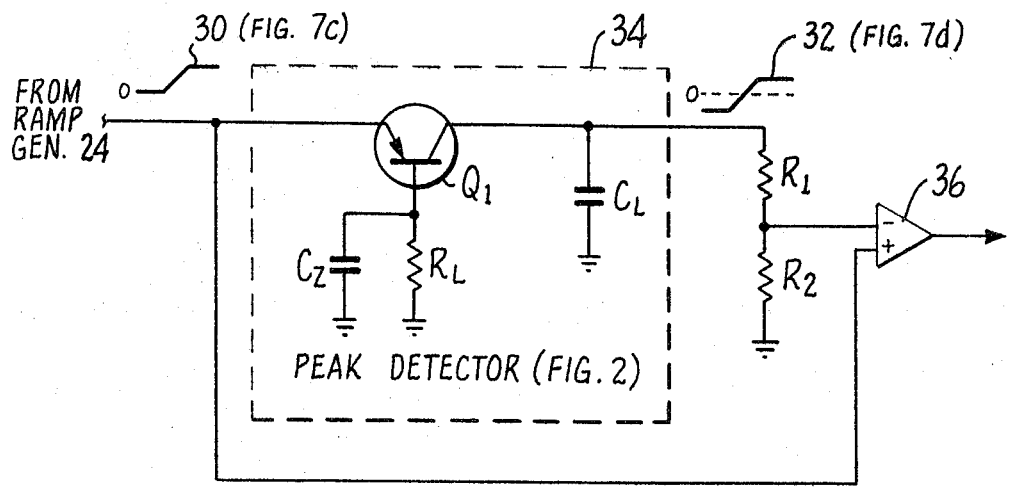
FIG. 6 is a schematic, partially block, circuit diagram of a level shifter, according to an embodiment of the present invention.

FIGS. 5 and 6 show a further embodiment of the invention wherein the peak detector circuit forms a portion of a level shifter in a phase locked loop which is shown in part.

In FIG. 5, an accurate phase comparison between a pair of input pulses 14 and 18 is desired.

In FIG. 5, sampling pulse 14, of 4.5 $\mu$ seconds duration, for example, is applied to a one-shot multivibrator 20 which produces a narrow sampling pulse 16 (FIG. 7e) of 600 nanosecond width, for example, coincident with the leading edge of pulse 14. Pulse 16 is applied to the sampling input of a conventional sample and hold circuit 22. Ramp control pulses 18 (FIG. 7a), of 10 $\mu$ second length, for example, are applied to an input of conventional ramp generator 24 in order to start the ramp output 30 (FIG. 7c) at the leading edge of the pulse and to stop the ramp at the trailing edge of the pulse and hold the ramp value constant until a clamping pulse is received. The ramp base line begins at zero volts, for example. Clamping pulses on line 28 (FIG. 7b) cause the output voltage of generator 24 to return to the baseline voltage.

It will be apparent that unless the ramp applied to sample and hold 22 is symmetrical at about zero volts that there will be an error introduced into the phase error output signal which is applied to a voltage controlled oscillator (VCO) (not shown) as is conventional in phase locked loops. While ramp generator 24 can be designed to provide an accurate, linear ramp, it is necessary to accurately center the ramp above and below zero volts so that when the phase locked loop is in phase lock the sample pulse 16 will provide a zero volt sample.

Figure 7:
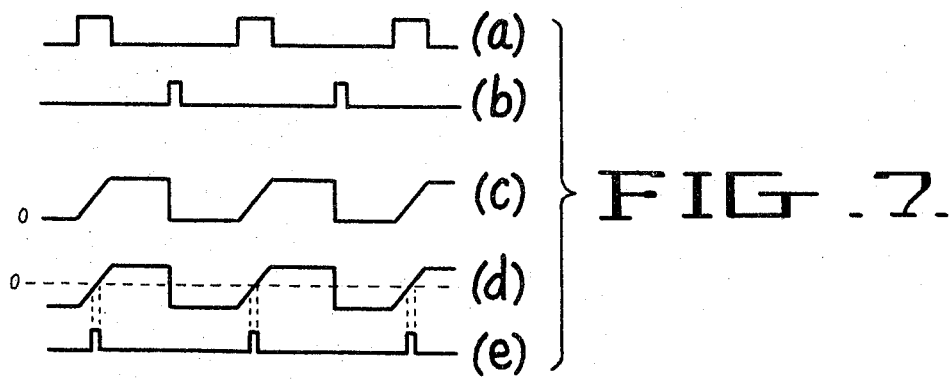
FIGS. 7(a) – 7(e) are a series of waveforms useful in understanding FIGS. 5 and 6.

Thus, the ramp 30 is applied to a level shifter 26 that symmetrically disposes the ramp 30 around zero volts to provide ramp 32 (FIG. 7d). Thus when the sample pulse 16 (FIG. 7e) samples ramp 32 at the center of the ramp, this point is zero volts. If the ramp had not been centered on zero a sampling at the center of the ramp would yield a static error voltage which would upset the operation of the loop.

FIG. 6 shows the level shifter 26 in greater detail. The ramp 30 (FIG. 7c) from ramp generator 24 is applied to the input of the peak detector as shown in FIG. 1. The peak detector output is applied to series voltage divider resistors R1 and R2 which provide one-half the peak signal at their junction which is connected to the negative input of a conventional differential amplifier 36. The ramp 30 (FIG. 7c) is applied directly to the positive input of differential amplifier 36. The time constant of $R_L$ and $C_L$ is chosen so that the output of peak detector 34 holds for a complete cycle following each ramp 30. Thus, one-half the ramp 30 maximum is subtracted from the ramp 30, hence ramp 30 is automatically disposed symmetrically above and below zero volts. It will be apparent that the circuit functions independently of the signal amplitude, hence the phase locked loop will be insensitive to amplitude variations due to changes in component values, temperature changes, etc.

The present invention has been described by way of a specific circuit example, but it will be understood that the invention is to be protected within the full scope of the appended claims.

I claim:

1. Level shifter apparatus comprising a transistor having an emitter, base and collector,
   means for applying an input signal to be level shifted between said emitter and ground,
   capacitor means connected between said collector and ground,
   resistor means connected between said base and ground,
   voltage divider means connected between said collector and ground,
   differential means for subtracting a first signal voltage from a second signal voltage,
   means connected to said voltage divider means for applying the voltage thereat to said differential means as said first signal voltage, and
   means for further applying said input signal to said differential means as said second signal voltage.

2. The apparatus of claim 1 further comprising diode means connected in series between said base and said resistor means.

3. The apparatus of claim 1 further comprising further capacitor means in parallel with said resistor means.

4. The apparatus of claim 2 further comprising further capacitor means in parallel with said resistor means.

* * * * *